INVENTOR.
KLAUS SCHNEIDER

INVENTOR.
KLAUS SCHNEIDER

United States Patent Office 3,351,389
Patented Nov. 7, 1967

3,351,389
DEVICE FOR HYDRAULICALLY EMPTYING CONTAINERS FILLED WITH SOLID BODIES
Klaus Schneider, Rostock, Germany, assignor to Veb Peene-Werft Wolgast, Wolgast, Germany
Filed May 12, 1966, Ser. No. 549,724
9 Claims. (Cl. 302—14)

ABSTRACT OF THE DISCLOSURE

A container has at its bottom stationarily installed rinsing water inlets and discharge aperture which is connected with a double-stage jet pump system provided with one or two diffusers adapted to separate wastewater from the transferred material. Waste-water outlets are selectively connected with the drive-water circuit and directly with the drive-water inlet of the first stage jet pump. Drive water circuit is also selectively connected to the container rinsing system. A compressed air conduit is attached to the transferred material outlet means to increase the transportation height.

---

The invention relates generally to a device for hydraulically emptying containers, and more specifically to a device for hydraulically emptying containers filled with solid bodies, such as fish, by employing single or multiple-stage jet pump systems.

It is known to convey fish from containers, particularly from storage spaces by means of water jet pumps and waste water. These fish pump plants are either mobile, or they are installed on a boat or mounted in a stationary manner on shore. These are either single, or two-stage pumps. For the purpose of forming a mixture, the waste water of diffusers is fed back to the fish storage room by means of flexible conduits. The feedback of the waste water is effected adjacent the suction terminal of the suction hose and leads to a local formation of a mixture, especially in the approximate neighborhood of the suction. The more the storage device is emptied, the more water is present in the storage device and the flexible waste water conduits are used for sucking fish from all corners of the storage room towards the suction opening. Suction conduit and rinsing conduit are to be moved in horizontal and vertical directions so that the most effective discharge of the storage device is achieved.

Both jet pumps of a two stage plant are either fed each by a separate drive pump or by a mutual drive pump. The water will be sucked directly from a water source. In the case where fish is not pumped directly from storage tanks, but from a net bag with a waterfish mixture, returning of the water for forming the mixture becomes unnecessary. Single stage jet pump plants are known wherein the drive pumps operate in a closed cycle and are connected, with the diffusers at the suction end of the pump for this purpose.

The known emptying devices are disadvantageous due to the expensive operation of the device and due to the difficult handling of the filled flexible suction and rinsing hoses. For operating the heavy suction hose, which is strengthened by wire coil, special mechanical lifting devices are required. During the discharging operation, the suction opening must always be directed into the zone of optimal fish concentration. Furthermore, penetration of air into the suction hose must be avoided. However, this is especially problematic about the finish of the emptying operation. Due to the movements of the flexible conduits, especially the suction funnel, the fish will be damaged in the fish-water mixture. If air penetrates the jet pump, the delivery efficiency is considerably reduced and the fish damage is substantially increased. In the case where the suction funnel gets too close to the walls of the fish tanks, the funnel will be sucked against them and the work performance is interrupted. The water which is returned from the diffuser into the storage tank gives an insufficient rinsing effect with respect to the suction orifice of the fish conduit, despite the heavy manual labor applied to achieve an effect. With such prior art devices, it is hardly possible to build the storage device on board ships in such a way that the fish is automatically fed in any desired quantity into the suction orifice. A large delivery head with a minimum of fish damage can only be achieved by employing multi-stage jet pumps. Moreover, there are no opportunities to clear the conduits, which are clogged by larger fish, in a fast and efficient way without heavy manual labor.

It is therefore an object of the present invention to overcome the shortcomings of the known discharge devices and to provide a fish transfer device which operates with a minimum of service operation, more economically, more reliably, and has a higher efficiency with a lesser degree of fish damage.

The device in accordance with the invention is also adapted to be automatically controlled.

It is another object of the invention to provide a fish transfer device including a jet pump which is fixedly attached to a container, with all individual elements of the device being economically arranged and which permits a multitude of switching possibilities during the transferring operation.

In accordance with the invention, the inventive arrangement of rinsing conduits warrants a complete emptying of the fish storage containers.

Additional switching possibilities provided in accordance with the invention make it possible to initate measures for removing cloggings within the jet pump device.

In the fish transfer device according to this invention the jet pump system is connected to a discharge aperture which is disposed on the container bottom. The jet pump or pumps are driven by drive water pumps over drive water conduits and are fed by the waste water of their associated diffusers. The drive water pumps and the waste water conduits are connected with a stationarily installed rinsing water system of the containers. Furthermore, the waste water conduits of the diffusers are connected with the drive water conduits. Compressed air will be introduced into the stand pipe through which the fish are conveyed to the transfer funnel on deck of the ship. Preferably a jet pump which represents a main stage is arranged behind a jet pump which serves as a preliminary stage. A diffuser is connected to the jet pump which represents the main stage. The waste water conduit of the diffuser is connected with the preliminary stage. An additional diffuser may be arranged between the jet pumps, and the waste water is directed to the outside of the ship. In a simplified arrangement, a connection is provided in front of the jet pump instead of a preliminary stage, which is connected to the drive water conduit and to the waste water conduit of the diffuser. The main stage may also be arranged within the closed circuit. In that case, the jet pump and diffuser are connected with each other by means of a drive water pump. A shut off valve is provided within the stand pipe.

A shut off valve is also arranged in the feed pipe in front of the preliminary stage. A transfer funnel is arranged on the end of the stand pipe. The transfer funnel is also formed as a water separator and is connected with the rinsing system of the container and the preliminary stage.

The invention permits the elimination of heavy physical handling of the large suction and rinsing conduits during the emptying operation. Lifting devices for the device are no longer required. The stationary rinsing-and delivery system provided for the container warrants a satisfactory, continuously and complete discharge of the container, due to its multitude of switching possibilities. The penetrating of air into the delivery system before the container is completely discharged, is also eliminated. The construction and the method of operation of the device guarantees a lesser degree of fish damage. The employment of water jet-fish pumps also increases the quantity of delivery. Clogging and impurities of the plant may be removed fast and efficiently.

Moreover, possibilities exist to limit the amount of water for the discharging operation to a minimum, and to substantially increase the degree of effectiveness. In general, the inventive device has an increased delivery capability, a higher operational performance, reliability as well as a minimum of service operation. Moreover, a substantially automatic control of the fish container emptying operation is made possible.

For a better understanding of the invention, its operating advantages and the specific objects attained by its use, reference should be had to the accompanying drawings and the descriptive matter in which.

Figure 1:
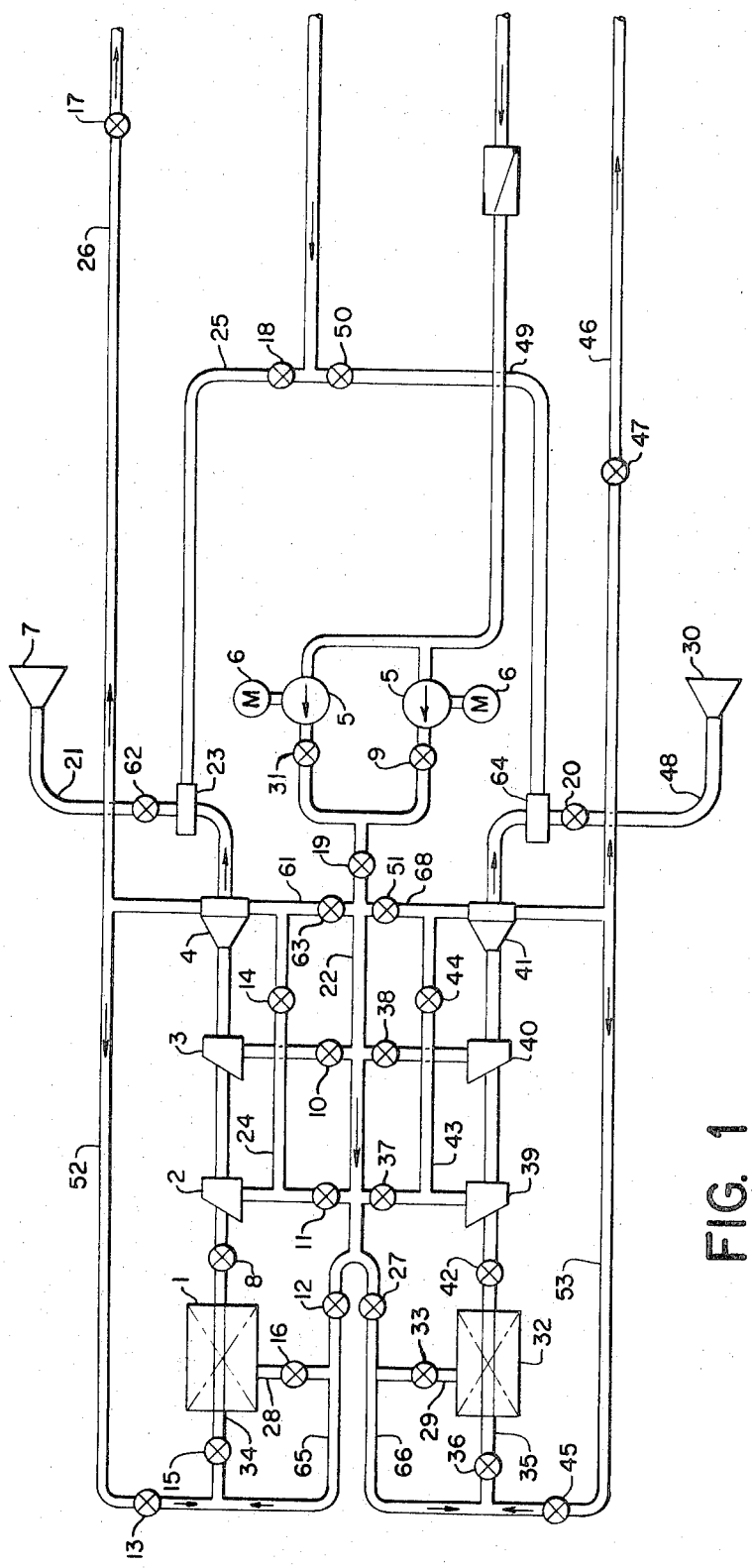
FIG. 1 is a diagram of a double-container plant with an open drive-water circuit.

In FIG. 1, a double container plant, consisting of two symmetrically arranged devices according to the invention, is schematically shown. Since both devices are identical for reason of simplification only one of them will be discussed in further disclosure, whereby the corresponding reference numerals of the second device will be indicated in brackets. The plant which can be installed for instance on a fishing vessel, consists of container 1 (32), adapted to receive and store solid bodies such for example as fish, and has rinsing inlets 34, 28 (35, 29) and an outlet disposed on the bottom portion. A two stage water jet pump system, consisting of a first jet pump 2 (39) and of a second jet pump 3 (40), is connected via shut-off valve 8 (42) to the outlet of said container 1 (32). The outlet of the second jet pump 3 (40) is provided with diffuser 4 (41), which includes waste-water separating means with a plurality of outlets, and a fish forwarding outlet means, namely a transferring standpipe 21 (48) and a funnel 7 (30), conwater outlet, respectively, are connected via shut-off valve 62 (20). The jet pump system has an individual drive-water inlet for each jet pump 2, 3 (39, 40); jet pump system drive-water inlets and a diffuser wastewater outlet, respectively, are connected via shut-off valves 11, 10 (37, 38) and via conduit 61 (68) provided with shut-off valve 63 (51) to the drive-water conduit 22, which is common for both devices. In this embodiment of the invention, the drive-water is supplied to the common conduit 22 from an external drive water supply (not shown) by means of shut-off valves 19, 31, 9 and drive-water pumps 5. Valve 19 is a quick action valve and is provided in the drive-water conduit 22 directly behind the shut-off valves 9 and 31. Drive water pumps 5 each of which is driven by motor 6 can be housed conveniently in the machine room of the fishing vessel. The output of the common conduit 22 is connected via shut-off valve 12 (27) to the rinsing inlets 34, 28 (35, 29) of container (1). Inlet 34 (35), provided with throttle valve 15 (36) is adapted for rinsing the groove which extends to the outlet aperture, whereas inlet 28 (29) provided with throttle valve 16 (33), is adapted for rinsing the container bottom. One of the waste-water outlets of said diffuser 4 (41) is connected on the one hand by means of conduit 52 (53) provided with shut-off valve 13 (45) to both rinsing inlets 34, 28 (35, 29), and on the other hand via conduit 26 (46) provided with shut-off valve 17 (47) to the outside of the ship. Another waste-water outlet of the diffuser 4 (41) is directly connected via conduit 24 (43) provided with shut-off valve 14 (44) to the drive-water inlet of the first jet pump 2 (39). A connection 23 (64) is provided at the fish forwarding outlet of diffuser 4 (4) for introducing compressed air by means of conduit 25 (49) provided with valves 18 (50) from a source of compressed air (not shown).

The device operates in the following way:

In case of dry-storing, the containers 1 and 32 must be flooded before the emptying operation begins. For this purpose, drive-water of drive pumps 5 will be switched onto both containers. Thereby, both devices are in an operative position, that is shut-off valves 9 and 31, 10 and 38, 8 and 42, 62 and 20, 17 and 47, and throttle valves 16 and 33, 15 and 36, respectively, are opened. The same is true for the shut-off valves 11 and 37, 12 and 27, respectively, which are selectively opened when shut-off valves 14 and 44, 13 and 45, respectively are closed, or vice versa. Shut off valves 63 and 51, respectively, are closed. Therefore, both jet pumping systems 2, 3 and 4 and 39, 40 and 41, respectively, receive only half of the drive-water quantity which would be required for the nominal delivery quantity. At a corresponding geodetic delivery height of the device, no lifting action takes place at that point, and the drive-water is fed into containers 1 and 32, respectively, via valve 8 preliminary jet pump 2 and second jet pump 3, and via valve 42, preliminary jet pump 39 and second jet pump 40, respectively. When the containers are filled, the emptying operation may start by switching the complete drive-water quantity onto one jet pump system 2 and 3, for instance, by closing shut-off valves 27, 37 and 38.

All valves are remotely controlled by a control center (not shown), whereby corresponding switching programs are automatically initiated, such as starting, flooding, switching and delivery. A water level indicator (not shown) coupled with an automatic warning and safety device is provided in each of the containers 1 and 32, respectively.

An optical and an acoustical warning signal is triggered for the benefit of the operator when a critical water level is reached in containers 1 and 32, respectively. Should the water level increase any further, for instance, due to late switching to delivery operation, the quick-action valve 19 is automatically actuated.

When containers 1 and 32 are filled, the emptying operation may be started by means of pumping stages 2, 3 and 4; and 39, 40 and 41, respectively. If container 1 is desired to be discharged, the shut-off valves 27, 37, and 38 are closed. When discharging container 32, the shut-off valves 10, 11, and 12 remain closed while the shut-off valves 27, 37, and 38 are opened.

During the discharge operation of containers 1 and 32, water must be supplied thereto. The water is supplied to the bottoms of containers 1 and 32 by means of throttle valves 15, 16 and 33 and 36, respectively, in such a way that a rinsing is carried out simultaneously. This mode of operation warrants, that the contents of containers 1 and 32 get to their respective discharge apertures. The rinsing operation is carried out either by means of drivewater pumps 5, by branching off the required water quantity from the drive-water pumps 5 over drive-water rinsing pipe 65 and 66, respectively, or it is carried out in a closed rinsing cycle by means of the waste water from diffusers 4 and 41, respectively, and rinsing conduits 52 and 53, respectively. The latter possibility is particularly advantageous, when high delivery heights have to be overcome by the jet pumps 3 and 40, and when a maximum quantity should be delivered.

The kinetic energy of the waste water from diffusers 4 and 41 is further used to drive the preliminary jet pumps 2 and 39, respectively, by means of the connecting conduits 24 and 43, respectively. Thereby, the quantity of transferred material entering the second jet pumps 3 and 40, respectively, will be increased, at a reduced difference in speed of the drive-water jet stream and the fish mixture. When preliminary jet pumps 2 and 39, respectively, are driven by the waste water of diffusers 4 and 41, respectively, the shut-off valves 11 and 37 respectively, are closed so that the total drive water is admitted to jet pumps 3 and 40, respectively. Superfluous waste water may be discharged by means of the discharge conduits 26 and 46, respectively. The discharge apertures of the discharge conduits 26 and 46, respectively, are arranged as low as possible, so that an additional increase of efficiency is achieved, due to the effect of the known siphon lifting principle. Compressed air is admitted to stand pipes 21 and 48, respectively, to further increase the delivery height. For this purpose, compressed air conduits 25 and 49 are provided with valves 18 and 50, respectively, as well as with intermediate pieces 23 and 64, respectively, at the beginning of stand pipes 21 and 48, respectively.

In order to prevent a premature admission of air into the jet water pumping stages, and to achieve a satisfactory and complete discharge of containers 1 and 32, the discharge conduits must be arranged correspondingly low in containers 1 and 32, or must be connected on the bottom portions of the containers by means of a water shut-off device. A return flow of water which remains in jet pump systems 2, 3, 4 and 39, 40, 41, respectively, and in feed pipes 21 and 48, respectively, after the emptying operation in containers 1 and 32, respectively, may be avoided by closing shut-off valves 8 and 42, respectively, by simultaneous turning off the supply of drive-water for jet pumps 3 and 40, respectively.

The double container device is preferably adapted for fishing vessels. Thereby, it is possible to vary the number of containers by omitting or adding of individual devices or jet pumps according to requirements.

Figure 3:
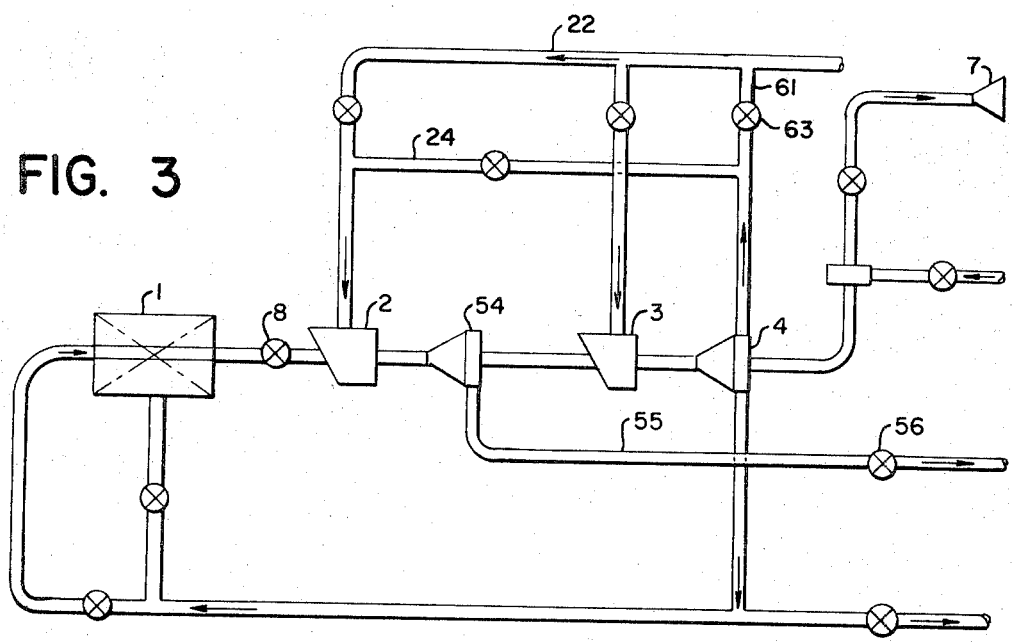
FIG. 3 is a diagram of a device with a diffuser for a pre-separation of water directly behind the preliminary jet pump stage.

The arrangement as shown in FIG. 1 is particularly advantageous in small spaces. If more space is available on board, other modifications will be employed. In accordance with FIG. 3, a similar configuration to that portion of the plant illustrated in FIG. 1 containing jet pumping systems 2, 3 and 4, illustrates the addition of a diffuser 54, which is employed between preliminary jet pump 2 and second jet pump 3, to facilitate water separation after the preliminary jet pump 2. In that way, the mode of operation and the efficiency of the jet pumping stages are improved. This is particularly true when preliminary stage 2 is not driven through drive-water conduit 22, but by waste-water of diffuser 4 over connecting conduit 24, due to relatively high pressures and small suction heights present in the device. Diffuser 54 comprises a waste water conduit 55 which may be closed by a shut-off valve 56.

Figure 2:
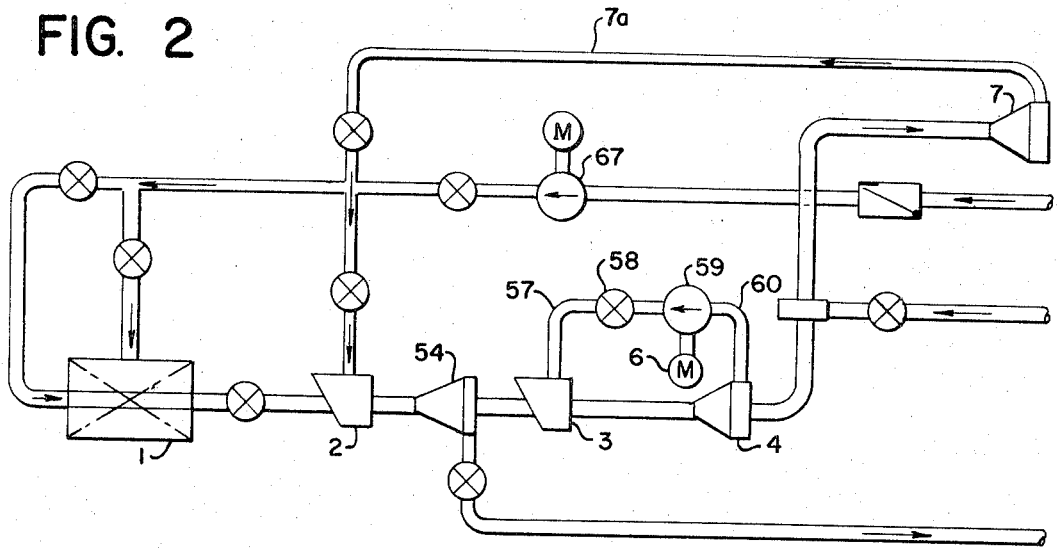
FIG. 2 is a diagram of a single-container device circuit with a closed drive-water circuit.

According to FIG. 2, jet pump 3 and diffuser 4 are actuated in a closed cycle. Jet pump 3 is fed by a drive-water pump 59 over a drive water conduit 57 in which a shut-off valve 58 is provided. Drive-water pump 59 is connected to the waste water outlet of diffuser 4 by means of supply pipe 60. This way, a continuous circulation of water is performed in the second stage of the jet pump system. Drive water pump 59 is preferably installed within the fish storage chamber. When actuating the device, auxiliary pump 67 is started. By means of the auxilary pump 67, container 1 will be flooded and thereafter drive-water pump 59 is started by means of preliminary stage 2 and diffuser 54 as well as jet pump 3 and diffuser 5. During the emptying operation auxiliary pump 67 delivers the rinsing water for container 1 as well as the drive water for preliminary stage 2. Against the end of the emptying operation, the rinsing water supplied to container 1 is reduced in favor of the drive water quantity for preliminary stage 2. The transfer funnel 7 which is employed to deliver the outgoing solid bodies to receiving tanks, may be formed as a water separator as shown in FIG. 2, whereby the water is returned by a connecting line 7a to preliminary stage 2 and container 1. The remaining parts of the rinsing system are similar to the one shown in FIG. 1. The auxiliary pump may be throttled or shut-off after the device is in operation and the rinsing of the containers and the operation of preliminary stage 2 may be performed by the return water quantities from transfer funnel 7.

An important prerequisite for a smooth functioning of the plant is to eliminate any cloggings fast and efficiently. According to the extent and at the location where the clogging takes place, different measures may be undertaken.

When light cloggings occur, it will suffice to achieve an interruption of the delivery operation by throttling the plant, or by switching on or switching off the drive-water in front of preliminary stage 2 and 39 and jet pumps 3 and 40, respectively. Thereby, the liquid which is present in the feed pipes 21 and 48, respectively, returns to containers 1 and 32, respectively, thus removing the fish which have accumulated in the small lateral sections of the plant.

On the other hand, there are possibilities to eliminate larger cloggings by means of force. When shut-off valves 8 and 42 are closed the static pressure in front of the clogging is automatically increased when drive-water is constantly supplied to the jet pumps 3 and 40, respectively, and preliminary stages 2, 39 and 40, respectively. As soon as the pressure is strong enough, the fish which caused the clogging will be pressed outwardly. When shut-off valves 62 and 20 are closed behind the intermediate pieces 23 and 64, respectively, in stand pipes 21 and 48, respectively, the fish which caused the clogging will be pressed back into containers 1 and 32, respectively, whereby the shut-off valves 8 and 42 are open.

Depending on the location of the clogging the drive-water supply may be effected preferably over the connecting line 61, and 68 to diffusers 4, 41 and 54, respectively. Shut off valve 63 and 51, respectively, are provided in the connecting pipes 61 and 68, respectively.

Simultaneously with the elimination of the clogging, movement of the remaining fish from the grid or sieve like surfaces as well as the discharge apertures of diffusers 4, 41, 54, will be achieved.

The diffusers 4, 41, and 54 are constructed so that an adequate quantity of water may be separated from the sucked fish-water mixture and kinetic energy of the conveying liquid is transformed into potential energy. The diffusers are of double-wall construction. The interior jacket of the diffusers has grid-like or sieve-like surfaces for the water discharge. The exterior jacket of the diffuser is watertight and is provided with discharge funnels. Both the interior jacket and the exterior jacket of the diffuser may have the shape of a cylinder, truncated cone or of both together.

The grid-like or sieve-like surfaces are distributed either uniformly or here and there only over the interior jacket of the diffuser.

The construction of the sieve-like or grid-like surfaces depends on the nature of the mixture to be conveyed and on the quantity of water to be discharged.

Generally as much water is discharged from the diffusers as drive water in the jet pumps has been added to the sucked fish-water mixture.

While the above description discloses a preferred embodiment of my invention, my invention is by no means to be limited to the embodiments shown, but rather any limitation shall be so specified in the appended claims.

What is claimed is:

1. A device for hydraulically emptying containers filled with solid bodies, preferably fish, comprising at least a container adapted to store the solid bodies and having at least a rinsing inlet and an outlet disposed on a bottom portion of said container; a jet pump system having at least a jet pump with a suction inlet, a drive-water inlet, an outlet and being provided with at least a diffuser having an inlet, a waste-water means with outlets and a solid material outlet means; at least a drive-water pump having an inlet and an outlet; a plurality of conduit means provided with shut-off valves, wherein individual conduits connect, respectively, said suction inlet of said jet pump system to said container outlet; said drive-water pump outlet to a waste-water outlet of said diffuser, to the drive-water inlet of said jet pump system and to the rinsing inlet of said container; a waste-water outlet of said diffuser to said container rinsing inlet.

2. The device according to claim 1 wherein said jet pump system is a two-stage system wherein the first jet pump is connected via conduit means with said container outlet and the second jet pump is connected in series with said first jet pump whereby said conduit means directly connect the diffuser waste-water outlet with the first jet pump drive-water inlet.

3. The device according to claim 1 comprising a source of compressed air whereby said conduit means connect said source of compressed air with said diffuser solid material outlet means.

4. The device according to claim 2 wherein an auxiliary diffuser is connected between said first and second jet pump.

5. The device according to claim 2 comprising an auxiliary water pump, wherein the auxiliary water pump outlet is connected by the conduit means to the first jet pump drive-water inlet and to the container rinsing inlets, respectively, whereas the drive water pump is connected via said conduit means between the diffuser waste-water outlet and the second jet pump drive-water inlet.

6. The device according to claim 5 wherein said diffuser solid material outlet means include transferring standpipe provided with transfer funnel.

7. The device according to claim 6 wherein said transfer funnel is provided with a waste-water separator.

8. The device according to claim 7 wherein said waste-water separator is connected via said conduit means to the first jet pump drive-water inlet and to the container rinsing inlets, respectively.

9. The device according to claim 2 wherein diffuser solid material outlet means are provided with a shut-off valve for closing when said container is being filled up.

References Cited

UNITED STATES PATENTS

| | | | |
|---|---|---|---|
| 2,672,370 | 3/1954 | Jones et al. | 302—14 |
| 2,672,372 | 3/1954 | Jones et al. | 302—14 |
| 2,736,121 | 2/1956 | Kimmerle | 302—14 X |
| 2,794,685 | 6/1957 | Willis | 302—14 |
| 2,997,345 | 8/1961 | Stahle | 302—14 |
| 3,254,924 | 6/1966 | Harrison et al. | 302—14 |

EVON C. BLUNK, *Primary Examiner.*

M. L. AJEMAN, *Assistant Examiner.*